United States Patent Office 3,427,130
Patented Feb. 11, 1969

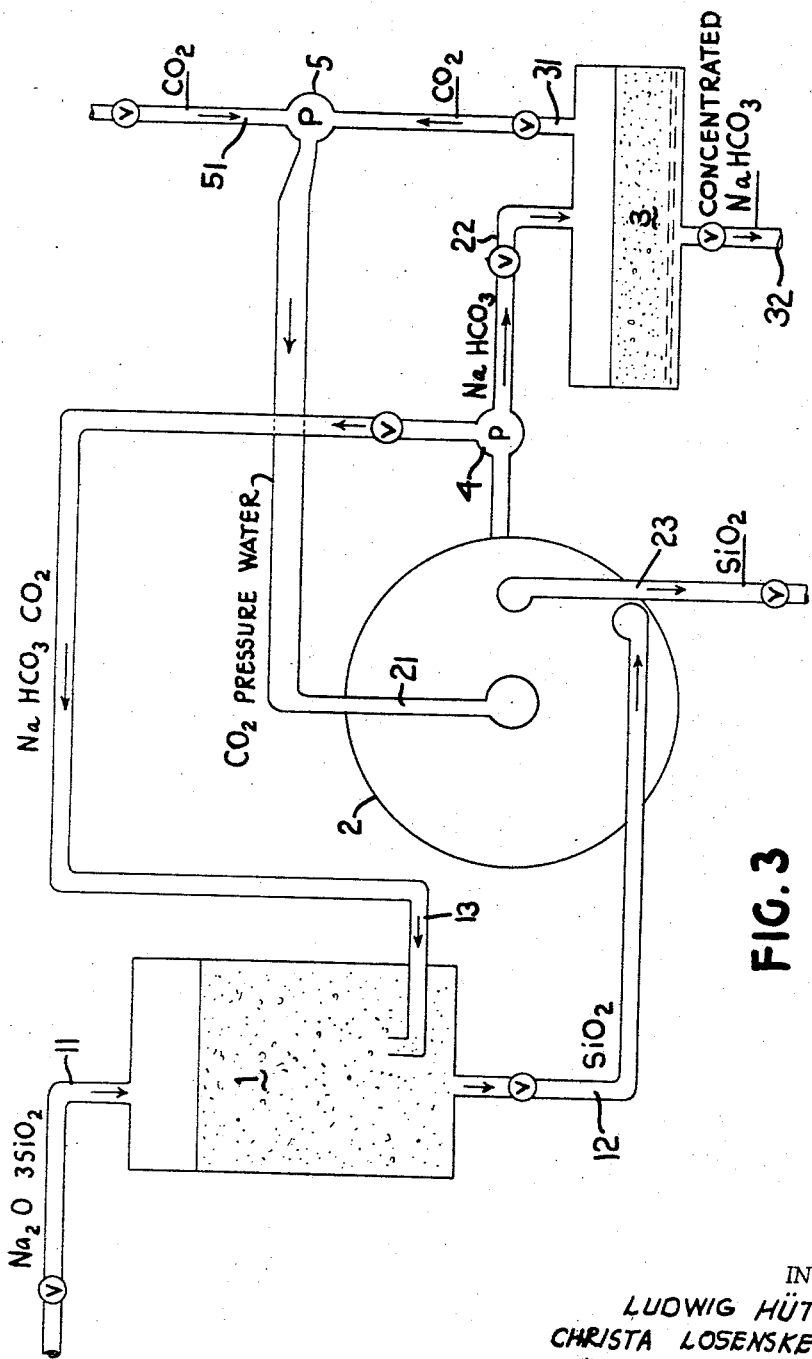

3,427,130
PROCESS FOR TREATING SILICIC ACIDS AND SILICATES
Ludwig Hüter, Weisskirchen, Taunus, and Christa Losenske and Dieter Schirmer, Frankfurt am Main, Germany, assignors to Deutsche Gold- und Silber-Scheideanstalt vormals Roessler, Frankfurt am Main, Germany, a corporation of Germany
Filed Dec. 9, 1965, Ser. No. 512,696
Claims priority, application Germany, Dec. 16, 1964, D 46,070
U.S. Cl. 23—182                                16 Claims
Int. Cl. C01b 33/18; B01d 11/00

ABSTRACT OF THE DISCLOSURE

A siliceous precipitate is filtered under pressure with carbon dioxide-containing water to effect the removal of cations contained in the precipitate. The filtration is desirably conducted at temperatures above 50° F. to the ambient boiling point of the carbon dioxide-containing water and at pressures between about 1 and about 40 atmospheres gauge. After the cations have been removed from the siliceous precipitate, the precipitate may be reloaded with a desired quantity of cations by contacting the precipitate with an aqueous solution containing the cations. For example, an aqueous solution containing dissolved sodium bicarbonate may be employed as a wash to reload the precipitate with a desired level of sodium.

---

Figure 1:
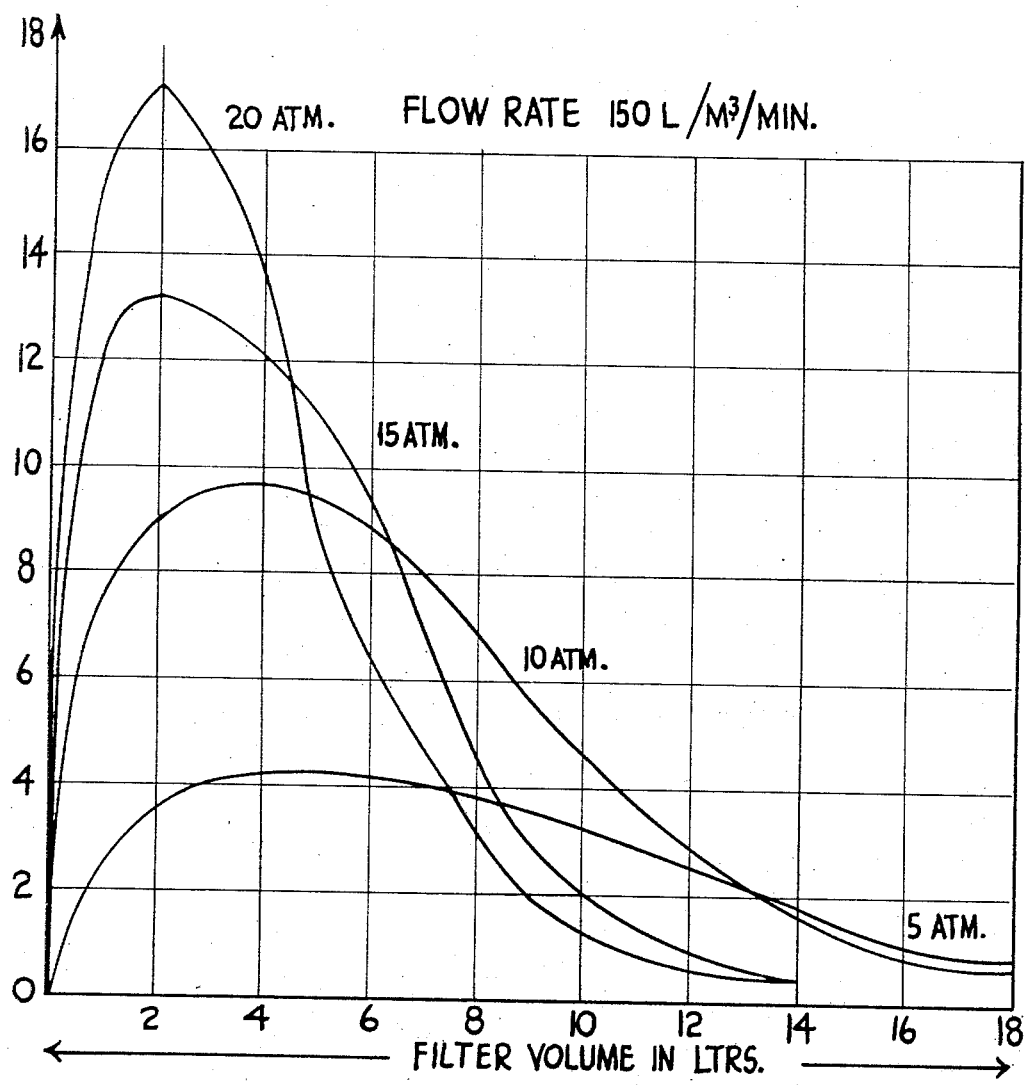

This invention relates to a process for purifying, regenerating, concentrating, and/or adjusting the level of ions in precipitated silicas or silicates. This process is carried out by a filtration and washing process in which quantitative removal of foreign ions can be achieved. These foreign ions may originate in the production of the silica or silicate or they may be impurities picked up by the silicates in use, e.g., as ion exchange materials or molecular sieves. Further, the level of ions in a siliceous product can be controlled by the practice of this invention either by removal or addition of cations.

The precipitation of finely-divided, active silica with a large surface area by neutralizing dilute sodium silicate solutions with carbon dioxide is well known. According to another process, finely-divided silica is precipitated from alkali silicate solutions by neutralization, e.g., to a pH value of about 8. In this way silica can be precipitated from a sodium silicate solution, for example with sodium chloride. If the silica is precipitated in an alkaline medium, it is especially characterized by the ease with which it can be filtered and its "chalky" structure. However, the sodium (or potassium) ions adhering to the surface of the silica have a deleterious effect when the silica is used for rubber reinforcement; and for optimum performance, these ions must be removed in some later treatment. Similar problems are encountered with siliceous products precipitated at pH's ranging from about 2 to about 10.

The removal of alkali metal ions from siliceous products has required great care. In the case of silica precipitated by neutralization with carbonic acid or bicarbonates, it has been found that the silicas cannot be made alkali-free without a post-treatment with a strong mineral acid. It has been found, in fact, that up to about 40 percent of the initial alkali content of the alkali metal silicate is retained in the silicas precipitated with carbon dioxide. This retention of ions represents a significant loss of raw materials. In addition, the properties of these silicas are greatly affected by the contamination of metal ions remaining in them. Thus, there have been numerous attempts to make the silicas free of metal ions by washing or by some other processing step, such as employing ion exchange materials. The use of these treatment methods imposes an additional burden on the technical operation of producing finely-divided silicas.

When hydrothermal methods are used to prepare alkaline earth silicates, such as calcium silicates, when a silica gel is precipitated as a cohesive mass, when heavy metal silicates are used as the source of the silica, it is also necessary to use some special treatment for removal of metal ions, especially sodium ions. Typically, removal of these contaminants is carried out by washing with pure water during a pressure filtration step. This procedure does not result in complete removal of the alkali ions.

Similarly, the removal of metal ions from complex silicates, such as the aluminum silicates, permutites and zeolites which are used for production of ion exchangers, molecular sieves or cracking catalysts presents special problems. Methods which have been used to overcome this difficulty are usually time-consuming and complicated.

In practice, it is often desirable to remove only part of the metal ions to some desired level to obtain desirable properties for use as rubber reinforcing materials or as carriers for catalysts.

The present invention provides a process for purifying silicas and silicates and also for regeneration and concentration of siliceous slurries. This process makes it possible to remove foreign ions, especially alkali and alkaline earth metal ions, completely from the silicas. Alternatively, the ion level may be adjusted to some desired value. According to some embodiments of this invention, the contaminants are recovered for use in a production process.

The characteristic feature of this invention is that the precipitated silicas and/or silicates are filtered in the presence of water containing dissolved $CO_2$ or bicarbonates. A preferred embodiment of this invention utilizes wash-water for the filtration in which carbon dioxide has been dissolved under pressure. If desired, the wash-water containing bicarbonate ions can be recycled for use in the precipitation step or in some other process. The alkali content can be recovered as bicarbonate by concentrating the wash-water containing the alkali metal ions.

The prior art washing step is usually carried out with distilled water, boiler condensate, or deionized water to achieve a filter cake or hydrated silicas, which is satisfactorily dry. The filtration is frequently carried out with pressure filters and requires considerable time for satisfactory washing. It is now discovered that ions, especially alkali metal ions such as sodium, are readily and completely removed from the silica when the wash water is saturated with carbon dioxide. This purification is accomplished in as short a time as a few minutes. Moreover, alkaline earth ions, such as those of calcium and magnesium and even the difficult to desorb trivalent cations of the type $M_2O_3$ (where M represents a heavy metal of the type of iron aluminum, chromium, etc.), which are often present as impurities in the silicate solutions from which the silica is precipitated, are also quickly and easily removed by the process of this invention. The time which is required to wash the filter cake of hydrated silica free of ions, such as sodium, is very dependent upon both the pressure at which the filtering is carried out and the temperature of the water used. For example, when the pressure of carbon dioxide over the wash-water is only 1 atmosphere, a barely detectable extent of deionization is obtained in a short time. However, if the pressure is increased to 10 atmospheres gauge, a practically quantitative deionization effect is obtained within a washing period of not more than one hour. The temperature of the water is normally not above the ambient boiling point, typically about 100 to about 200° F., rarely less than 50° F. Temperatures above about 100° F. are considered "elevated."

Figure 2:
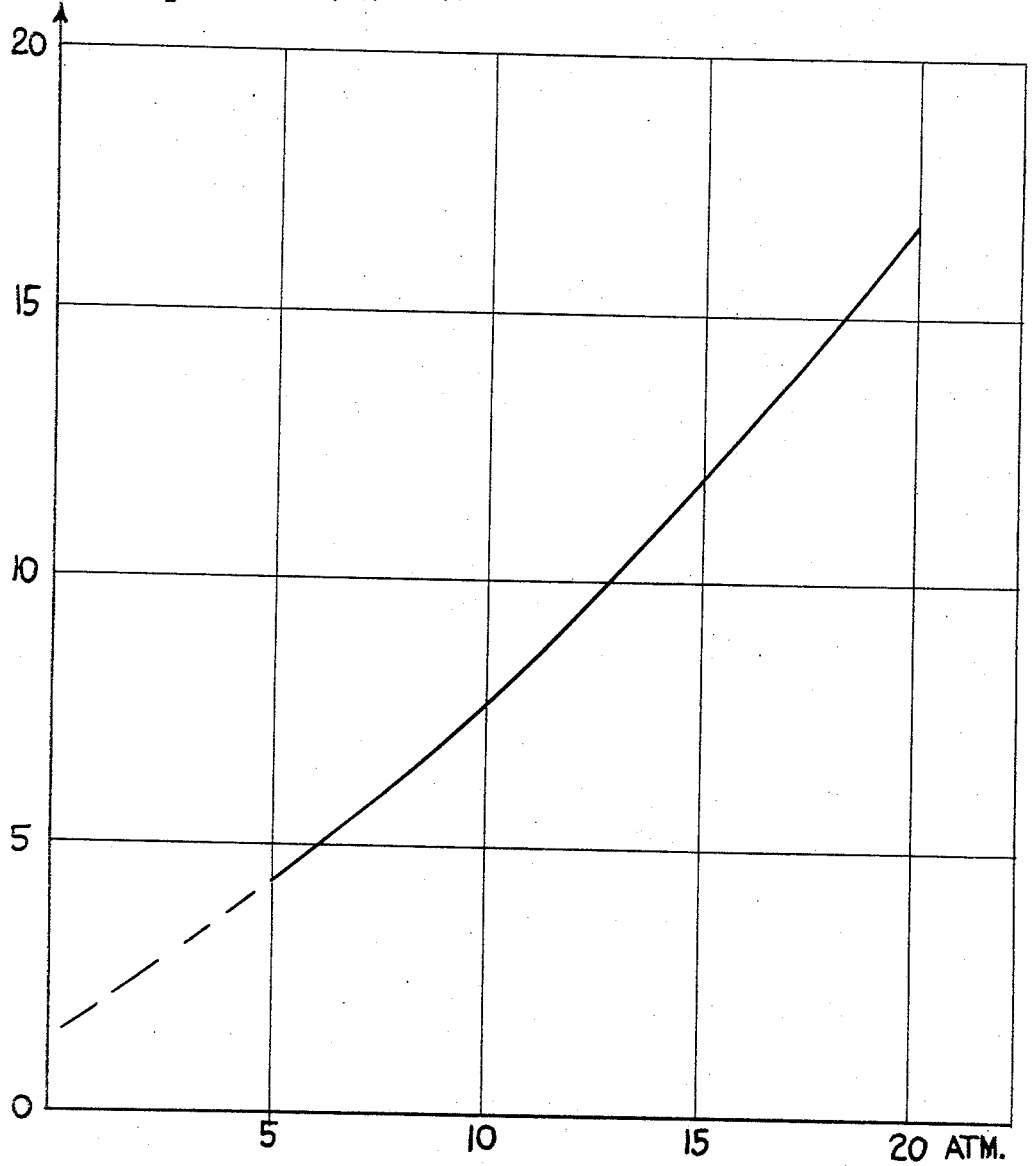

The invention will be more readily understood with reference to the accompanying drawings of which FIGURES 1 and 2 are pertinent graphical curves and FIGURE 3 depicts equipment employable in the practice of this invention.

FIGURE 1 shows the effect of washing as a function of pressure. As can be seen from the graph, the effect of the partial pressure of $CO_2$ on the removal of sodium ions, expressed as $Na_2O$ per liter of wash-water, increases with increasing pressure of $CO_2$ over the water used for washing. In this example, the flow rate of freshly precipitated silica slurry was maintained constant.

In FIGURE 2 is shown the relation between the maximum concentration of ions in the wash-water and the pressure of $CO_2$ over the wash-water. This curve shows again the simple, almost linear, relation between the maximum $Na_2O$ concentration in the filtrate and the pressure of carbon dioxide over the wash-water. For example, the sodium ions from the sodium silicate can be determined in the filtrate following the filter as a function of concentration and time. It is apparent that an optimum value was reached at an operating pressure of $CO_2$ of 20 atmospheres gauge. An increase in the operating pressure, e.g., to above 40 atmospheres, usually brings no advantages because the pressure filtration becomes more complicated.

In addition to the normal economics of using $CO_2$ for precipitation, it is also possible to recover the alkali values of the sodium silicate as sodium bicarbonate in aqueous solution. The bicarbonate solution can be concentrated by repeated circulation and will become saturated quickly under certain conditions. On the other hand, it can be used again at ambient pressure to precipitate silica from the silicate solution.

Carbonic acid solution (solutions of carbon dioxide in water usually under 25 atmospheres gauge pressure) is readily available to industry at low cost from "pressure water washing" of raw synthesis gases used, for example, for producing liquid ammonia (by conversion of carbon monoxide), methanol, or in the off-gases from petroleum.

The outstanding advantage of the proposed process lies in the properties of the finely-divided, active silica. They are changed fundamentally because of its freedom from alkaline oxides compared to normal silicas which contain soluble ions. Such a product offers extraordinary advantages in commercial applications. Especially noteworthy is their ease of dispersion for making silica sols.

Another advantage of the process of this invention is that the silica, once the soluble ions have been removed, can be treated to absorb other cations in the same filtering and washing step. Such a step is advantageous when the silica is used as a rubber reinforcing agent, or if the silica is to be modified for other special properties. As is known, the alkaline earth bicarbonates and heavy metal bicarbonates are soluble in water under a super atmospheric pressure of $CO_2$ in contrast to their normal carbonates which are practically insoluble. Therefore, it is particularly advantageous to dissolve hydroxides or carbonates in the wash-water subjected to $CO_2$ pressure.

Alternatively, the initial filtrates from the washing of the silica may be used. Under these conditions the precipitated $SiO_2$ may be more readily impregnated and the cations will deposit on the surface when the $CO_2$ pressure is released. In this way, it is possible to incorporate cations in hydrated silica by precipitation using foreign anions such as are naturally present during impregnations with salts. It is also possible to treat silicas and metal oxides, for example products obtained by thermal decomposition or natural products, in the same manner.

The use of $CO_2$ dissolved in water for the washing of precipitated silicas or silicates thus represents a new technique by which it is possible to carry out the following steps:

(1) The removal of cations from precipitated silicas and silicates, particularly alkali metal and alkaline earth ions, as well as multivalent cations of the type $M_2O_3$ such as aluminum, iron, etc.

(2) The recovery of more concentrated solutions of alkali ions if the initial filtrate is collected separately (see 2 in the drawing, FIGURE 3) followed by either precipitation or concentration by evaporation.

(3) Recovery of the alkali values in the filtrate as bicarbonate and return of the alkali values to the precipitation step resulting in recovery of the alkaline values for precipitation as well as concentration. This also increases the concentration of the alkali metal and alkaline earth ions.

(4) In the case of mixed products, it is possible to control or change the ratio of ion to silica in the product.

(5) The purified silica can be treated to absorb monovalent or multivalent cations, which were not originally present, for the purpose of modifying the silica, for example by loading with cobalt, nickel, silver, platinum, or molybdenum, etc. This is especially useful for the production of catalysts and zeolites.

The processes can be represented by the following equation which represents a reversible reaction:

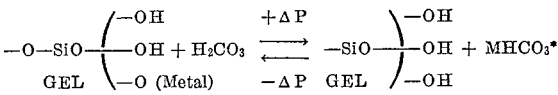

\* Soluble bicarbonate.

In the equation, $+\Delta P$ indicates the reaction goes in the direction of the arrow (to the right) when the pressure of carbon dioxide is increased. The $-\Delta P$ indicates that the reaction goes in the direction of the arrow (to the left) when the pressure of $CO_2$ is released and returned to atmospheric. Since the reaction is reversible, the metal ions which are present in solution as bicarbonates under high pressure of $CO_2$ during washing can return to their form as carbonates or can redeposit on the purified silica with other ions when the pressure of $CO_2$ is released. In this way it is possible to control the level of ions in the silica if a washing under super atmospheric pressure of $CO_2$ is followed by a release of pressure.

FIGURE 3 gives a block flow diagram for the washing and precipitation of silica and washing in the cyclic system using wash-water with a high $CO_2$ pressure. In the diagram, 1 is the precipitation vessel; 2 is the pressure filter; and 3 is the concentration vessel. The alkali silicate solution flows from the inlet 11 into the vessel 1. A pipe 12 serves to advance the slurry to the pressure filter 2 which is connected by pipe 21 to the pressure feed pump 5. The pressure feed pump 5 is supplied with carbon dioxide from the pipe 51 and pipe 31 which is connected to the concentration vessel 32. Pipe 22 for the wash-water containing sodium bicarbonate is connected to the concentration vessel 3 by means of another pressure feed pump 4.

The process of precipitating silica from alkali silicate solution, as well as the subsequent washing, is carried out introducing $CO_2$ or solutions containing bicarbonate ions, into the precipitation tank 1. The slurry of freshly precipitated $SiO_2$ is drawn off through pipe 12 and runs into the pressure filter 2 in which the filtration and washing with water containing dissolved $CO_2$ is carried out. Alkali ions are removed from the precipitated silica in this step and are taken with the filtrate to the concentration vessel 3, or into the precipitation vessel 1, by pipe 13 using the pressure feed pump 4. This solution contains alkali as dissolved sodium bicarbonate.

This process can also be modified within the scope of the invention for purposes of preparing purified, regenerated, or treated silicates. It is not intended to limit the scope of this invention by reference to specific details herein except to the extent these details are incorporated in the claims.

What is claimed is:

1. A process for reducing the concentration of cations in siliceous precipitates comprising washing a siliceous precipitate containing cations by passing water containing dissolved carbon dioxide and/or bicarbonate ions through a filter cake of said siliceous precipitate at a temperature above about 50° F. while applying a pressure of 1 to 40 atmospheres gauge upon said water as it enters said filter cake, thereby removing a substantial portion of said cations from said siliceous precipitate.

2. The process of claim 1 wherein said washing is conducted at a pressure of from about 5 to about 20 atmospheres gauge.

3. The process of claim 2 in which the siliceous precipitate is an alkali, alkaline earth and/or alumina silicate.

4. The process of claim 2 wherein said water contains siliceous precipitate which siliceous precipitate is filtered from said water as said water enters said filter cake.

5. The process of claim 1 wherein said washing is conducted at a pressure of from about 10 to about 20 atmospheres gauge.

6. The process of claim 2 wherein the pressure is provided by compressed carbon dioxide.

7. The process of claim 2 wherein the pressure is reduced during washing to control the concentration of cations remaining in the siliceous precipitate.

8. The process of claim 2 wherein after the concentration of cations in the siliceous pigment is reduced, the siliceous precipitate is contacted with an aqueous solution containing cations to reload the siliceous precipitate with a desired concentration of cations.

9. The process of claim 8 wherein the siliceous precipitate is reloaded with cations chemically different from the cations which were removed.

10. The process of claim 8 wherein the siliceous precipitate is reloaded with cations chemically the same as the cations which were removed.

11. The process of claim 10 wherein the cations are alkali metal ions.

12. The process of claim 2 wherein said washing is conducted at a temperature up to the ambient boiling point of the water containing dissolved carbon dioxide.

13. The process of claim 12 wherein said washing is conducted at a temperature between about 100° F. and about 200° F.

14. A process for the production of siliceous precipitate comprising:
(a) reacting in water an alkali silicate with carbon dioxide and/or bicarbonate ions dissolved in said water to precipitate therein a finely-divided silica which contains cations;
(b) filtering said finely-divided silica from said water to form a filter cake of said finely divided silica; and
(c) washing said filter cake by passing water containing dissolved carbon dioxide and/or bicarbonate ions through said filter cake at a temperature above about 50° F. while applying a pressure of from about 5 to about 20 atmospheres gauge upon said water as it enters said filter cake, thereby removing a substantial portion of said cations from said finely-divided silica.

15. The process of claim 14 wherein the water resulting from said washing contains bicarbonate ions and wherein at least a portion of this bicarbonate ion containing water is mixed with additional alkali silicate to precipitate in said portion of said water a finely-divided silica.

16. A process for the production of siliceous precipitate comprising:
(a) reacting in water an alkali silicate with carbon dioxide and/or bicarbonate ions dissolved in said water to precipitate therein a finely-divided silica which contains cations;
(b) establishing excess dissolved carbon dioxide and/or bicarbonate ions in said precipitate-containing water; and
(c) passing said water containing dissolved carbon dioxide and/or bicarbonate ions through a filter cake of finely-divided silica at a temperature above about 50° F. while applying a pressure of from about 5 to about 20 atmospheres gauge upon said water as it enters said filter cake, at least a portion of the finely-divided silica present in said water being filtered from said water as said water enters said filter cake, thereby removing a substantial portion of said cations from said finely-divided silica.

References Cited
UNITED STATES PATENTS 2,940,830 6/1960 Thornhill _____ 23—182
3,281,210 10/1966 Burke et al. _____ 23—182

OSCAR R. VERTIZ, *Primary Examiner.*

ARTHUR J. GREIF, *Assistant Examiner.*